United States Patent
Hoshiba et al.

(10) Patent No.: US 11,331,966 B2
(45) Date of Patent: May 17, 2022

(54) PNEUMATIC TIRE

(71) Applicant: The Yokohama Rubber Co., LTD., Tokyo (JP)

(72) Inventors: Takashi Hoshiba, Hiratsuka (JP); Tatsuro Shinzawa, Hiratsuka (JP); Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 355 days.

(21) Appl. No.: 15/770,159

(22) PCT Filed: Oct. 5, 2016

(86) PCT No.: PCT/JP2016/079653
§ 371 (c)(1),
(2) Date: Apr. 20, 2018

(87) PCT Pub. No.: WO2017/068981
PCT Pub. Date: Apr. 27, 2017

(65) Prior Publication Data
US 2018/0312013 A1    Nov. 1, 2018

(30) Foreign Application Priority Data
Oct. 20, 2015    (JP) .............................. JP2015-206516

(51) Int. Cl.
*B60C 19/00* (2006.01)
*B60C 5/00* (2006.01)

(52) U.S. Cl.
CPC .............. *B60C 19/002* (2013.01); *B60C 5/00* (2013.01)

(58) Field of Classification Search
CPC ......... B60C 13/00; B60C 15/00; B60C 11/00; B60C 1/00; B60C 19/002; B32B 5/18; B32B 7/12; B32B 3/28; B32B 3/08
See application file for complete search history.

(56) References Cited

U.S. PATENT DOCUMENTS 10,226,970 B2 *   3/2019   Yukawa ................. B60C 19/002
2006/0231185 A1 * 10/2006  Tanno ................... B60C 19/002
                                                              152/450

(Continued)

FOREIGN PATENT DOCUMENTS

CN          1899862        1/2007
JP        2006-341629     12/2006
(Continued)

OTHER PUBLICATIONS

International Search Report for International Application No. PCT/JP2016/079653 dated Nov. 15, 2016, 4 pages, Japan.

*Primary Examiner* — Matthew J Daniels
*Assistant Examiner* — Shibin Liang
(74) *Attorney, Agent, or Firm* — Thorpe North & Western (57) ABSTRACT

A pneumatic tire includes: an annular-shaped tread portion extending in a tire circumferential direction; a pair of sidewall portions disposed on both sides of the tread portion; and a pair of bead portions disposed on an inner side in a tire radial direction of the sidewall portions; wherein a band-like sound absorbing member is adhered on an inner surface of the tread portion in the tire circumferential direction; and a plurality of cuts with an angle θ with regard to the tire circumferential direction within a range of 40°≤θ≤90° are formed on both end portions in a lateral direction of the band-like sound absorbing member, and the cuts are connected only to one end portion in the lateral direction of the band-like sound absorbing member.

11 Claims, 5 Drawing Sheets

(56) References Cited

U.S. PATENT DOCUMENTS

| | | |
|---|---|---|
| 2007/0017619 A1 | 1/2007 | Yukawa |
| 2009/0277549 A1 | 11/2009 | Tanno |
| 2016/0288588 A1 | 10/2016 | Tanno |
| 2016/0339749 A1 | 11/2016 | Yukawa |

FOREIGN PATENT DOCUMENTS

| | | | | |
|---|---|---|---|---|
| JP | 2008254339 | * | 4/2007 | ............... B60C 5/00 |
| JP | 2008-254339 | | 10/2008 | |
| JP | 2009-034924 | | 2/2009 | |
| JP | 2009-039901 | | 2/2009 | |
| JP | 2009-126463 | | 6/2009 | |
| JP | 4281874 | | 6/2009 | |
| JP | 5267288 | | 8/2013 | |
| JP | 2015-147544 | | 8/2015 | |
| WO | WO 2005/012007 | | 2/2005 | |
| WO | WO 2015/076380 | | 5/2015 | |
| WO | WO 2015/118707 | | 8/2015 | |

\* cited by examiner

PNEUMATIC TIRE

TECHNICAL FIELD

The present technology relates to a pneumatic tire, and particularly relates to a pneumatic tire that can promote heat dissipation from a band-like sound absorbing member, and improve high-speed durability, in conjunction with relieving stress occurring on the band-like sound absorbing member when cornering, and improving the durability of the band-like sound absorbing member, by providing a cut on the band-like sound absorbing member adhered to an inner surface of the tire.

BACKGROUND ART

Cavernous resonance caused by the vibration of the air filled in a cavity portion of a tire is one cause of tire noise. Cavernous resonance is caused by a tread portion of a tire contacting a road surface during vehicle travel vibrating due to unevenness on the road surface, and the vibration is caused by air inside a cavity portion of a tire vibrating. The cavernous resonance has a frequency range where noise is generated, and reducing the noise level of the frequency range is important in order to reduce tire noise.

Attaching a sound absorbing member including a porous material such as a sponge or the like to an inner circumferential surface of a tread portion on a tire inner surface by an elastic fixed band has been proposed as a method of reducing noise due to the cavernous resonance phenomenon (for example, refer to Japanese Patent No. 4281874). However, if securing the sound absorbing member is dependent on the elastic fixed band, problems occur where the elastic fixed band deforms during high speed travel.

In contrast thereto, a method of directly adhering and securing a band-like sound absorbing member to a tire inner surface has been proposed (for example, refer to Japanese Patent No. 5267288). However, in this case, the band-like sound absorbing member is directly applied to a tire inner surface, and therefore, problems occur where heat accumulation is generated on a tread portion, and high-speed durability deteriorates due to heat accumulation. Furthermore, if the band-like sound absorbing member is directly applied on a tire inner surface, problems occur where the band-like sound absorbing member cannot follow tire deflection when cornering and therefore is damaged.

SUMMARY

The present technology provides a pneumatic tire that can promote heat dissipation from a band-like sound absorbing member, and improve high-speed durability, in conjunction with reliving stress occurring on the band-like sound absorbing member when cornering, and improving the durability of the band-like sound absorbing member, by providing a cut on the band-like sound absorbing member adhered to an inner surface of the tire.

A pneumatic tire of the present technology includes: an annular-shaped tread portion extending in a tire circumferential direction; a pair of sidewall portions disposed on both sides of the tread portion; and a pair of bead portions disposed on an inner side in a tire radial direction of the sidewall portions; wherein a band-like sound absorbing member is adhered on an inner surface of the tread portion in the tire circumferential direction; and a plurality of cuts with an angle θ with regard to the tire circumferential direction within a range of 40°≤θ≤90° are formed on both end portions in a lateral direction of the band-like sound absorbing member, and the cuts are connected only to one end portion in the lateral direction of the band-like sound absorbing member.

The present technology is configured such that a plurality of cuts are formed on both end portions in the lateral direction of a band-like sound absorbing member, and the cuts are connected only to one end portion in a lateral direction of the band-like sound absorbing member, and therefore, the cuts of an end portion of the band-like sound absorbing member can open and follow the deformation of a tire when the tire deflects when cornering, relieve stress generated on the band-like sound absorbing member, and suppress damaging of the band-like sound absorbing member. Thereby, the durability of the band-like sound absorbing member can be improved. Furthermore, the heat dissipation area of the band-like sound absorbing member increases based on the cuts of the band-like sound absorbing member opening during cornering, and therefore, heat dissipation from the band-like sound absorbing member can be promoted, and thus high-speed durability of the pneumatic tire can be improved.

In the present technology, a width a of the cuts of the band-like sound absorbing member is preferably 5% to 25% with regard to a width A of the band-like sound absorbing member. Thereby, the cuts on an end portion of the band-like sound absorbing member can open when cornering to promote heat dissipation from the band-like sound absorbing member.

A depth d of the cuts is preferably 50% with regard to a thickness D of the band-like sound absorbing member. Thereby, the cuts on an end portion of the band-like sound absorbing member can open when cornering to promote heat dissipation from the band-like sound absorbing member and improve high-speed durability of the pneumatic tire. Furthermore, damaging of the band-like sound absorbing member caused by tire strain can be effectively suppressed.

A volume of the band-like sound absorbing member is preferably 10% to 30% with regard to the luminal volume of the tire. Thereby, a sound absorbing effect based on the band-like sound absorbing member can be even further achieved. An excellent noise reducing effect can be achieved by increasing the volume of the band-like sound absorbing member, and a favorable stress relieving effect and heating dissipating effect can be demonstrated even with a large band-like sound absorbing member. The luminal volume of the tire is a volume of a cavity portion formed between a tire and rim in a condition where the tire is mounted on a regular rim and inflated to a regular internal pressure "Regular rim" is a rim defined by a standard for each tire according to a system of standards that includes standards on which tires are based, and refers to a "standard rim" in the case of Japan Automobile Tyre Manufacturers Association (JATMA), refers to a "design rim" in the case of Tire and Rim Association (TRA), and refers to a "measuring rim" in the case of European Tyre and Rim Technical Organisation (ETRTO). However, when the tire is an original equipment tire, the volume of the cavity portion is calculated using a genuine wheel to which the tire is assembled. "Regular internal pressure" is the air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

The band-like sound absorbing member preferably has a missing portion in at least one section in the tire circumferential direction. Thereby, long-term resistance is possible against expansion due tire inflation and shear strain of an adhering surface caused by a ground-contacting rolling motion.

BRIEF DESCRIPTION OF DRAWINGS

FIG. 5A to FIG. 5D are developed views of the modified examples.

DETAILED DESCRIPTION

Figure 1:
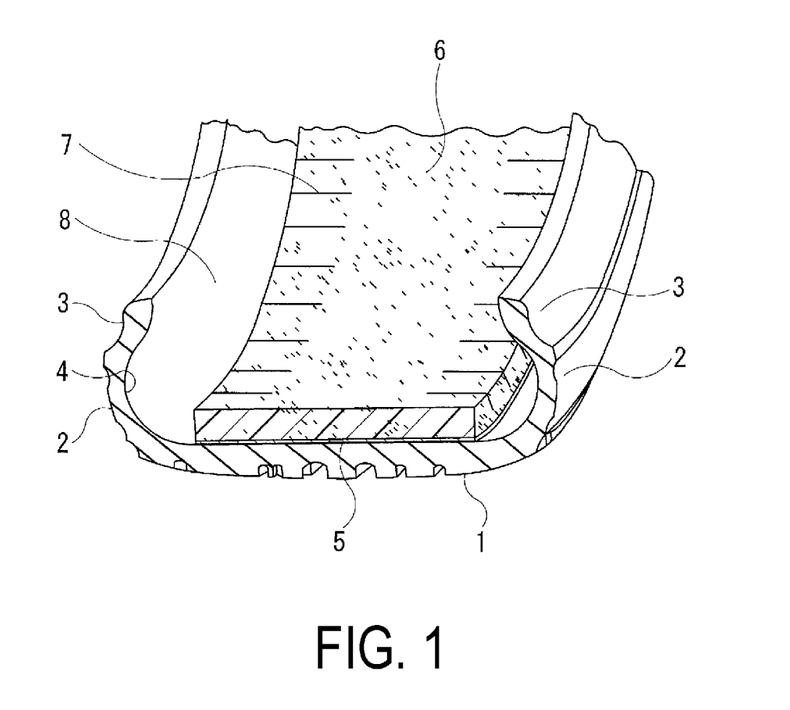
FIG. 1 is a perspective cross-sectional view of a pneumatic tire according to an embodiment of the present technology.
Figure 2:
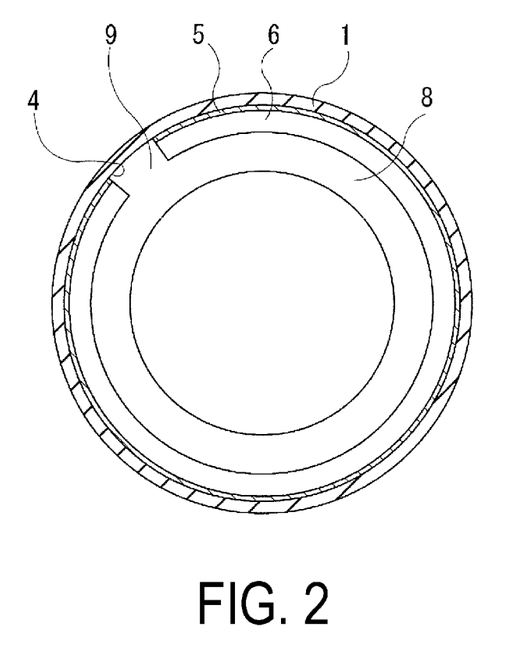
FIG. 2 is a cross-sectional view of an equator line illustrating a pneumatic tire according to an embodiment of the present technology.

A configuration of the present technology will be described in detail below while referring to the attached drawings. FIG. 1 and FIG. 2 illustrate a pneumatic tire according to an embodiment of the present technology. As illustrated in FIG. 1, the pneumatic tire according to the present embodiment includes an annular-shaped tread portion 1 extending in a tire circumferential direction, a pair of sidewall portions 2 disposed on both sides of the tread portion 1, and a pair of bead portions 3 disposed on an inner side in a tire radial direction of the sidewall portions 2.

In the aforementioned pneumatic tire, a band-like sound absorbing member 6 is adhered via an adhesive layer 5 along the tire circumferential direction to a region of a tire inner surface 4 corresponding to the tread portion 1. The band-like sound absorbing member 6 is made of open-cell porous material and has predetermined noise absorbing properties based on the porous structure. Polyurethane foam may be used as the porous material of the band-like sound absorbing member 6. On the other hand, a double-sided adhesive tape is preferable as the adhesive layer 5.

Figure 3:
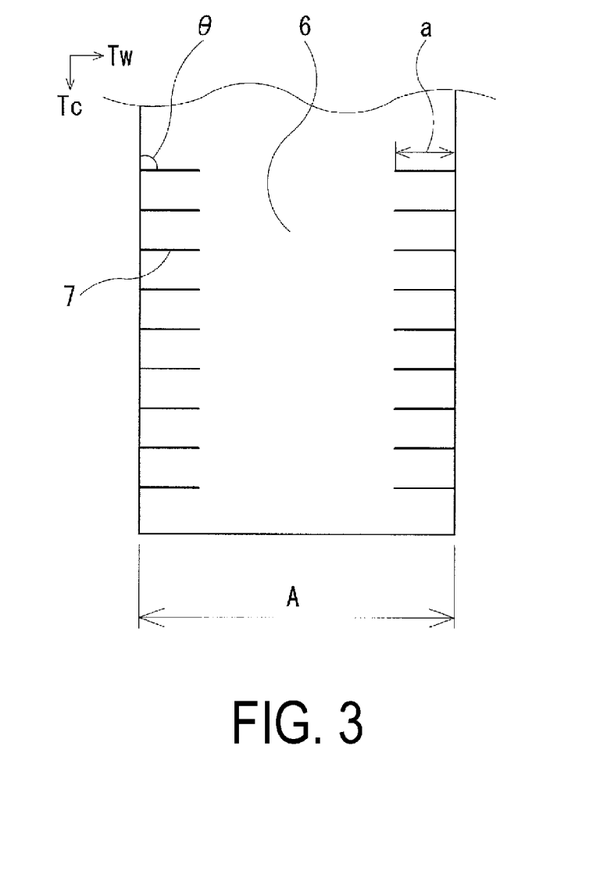
FIG. 3 is a developed view illustrating a portion of a band-like sound absorbing member adhered to an inner surface of a pneumatic tire of the present technology.

The plurality of cuts 7 are formed on both end portions in the lateral direction on the band-like sound absorbing member 6. The cuts 7 connect only to one end portion in the lateral direction of the band-like sound absorbing member 6. Herein, as illustrated in FIG. 3, an angle with regard to the tire circumferential direction of the cuts 7 of the band-like sound absorbing member 6 is set as angle θ. At this time, the cuts 7 are disposed such that the angle θ with regard to the tire circumferential direction of the cut 7 is within a range of 40°≤θ≤90°. Note that in FIG. 3, Tc represents the tire circumferential direction, and the Tw represents the tire width direction.

In the aforementioned pneumatic tire, the cuts 7 are formed on both end portions in the lateral direction of the band-like sound absorbing member 6 such that the angle θ with regard to the tire circumferential direction is within a range of 40°≤θ≤90°, but the angle θ is particularly preferably 90°. The plurality of cuts 7 are formed on both end portions of the band-like sound absorbing member 6, and the cuts 7 are connected only to one end portion in a lateral direction of the band-like sound absorbing member 6, and therefore, the cuts 7 of an end portion of the band-like sound absorbing member 6 can open and follow the deformation of a tire when the tire deflects when cornering, relieve stress generated on the band-like sound absorbing member 6, and suppress damaging of the band-like sound absorbing member 6. Thereby, the durability of the band-like sound absorbing member 6 can be improved. Furthermore, the heat dissipation area of the band-like sound absorbing member 6 increases based on the cuts 7 of the band-like sound absorbing member 6 opening during cornering, and therefore, heat dissipation from the band-like sound absorbing member 6 can be promoted, and thus high-speed durability of the pneumatic tire can be improved. Herein, when the cuts 7 are connected to both end portions in the lateral direction of the band-like sound absorbing member 6, friction between the band-like sound absorbing members 6 or cracks from a bottom portion of the cuts 7 occurs, which leads to damaging of the band-like sound absorbing member 6. Therefore, the cuts 7 have a configuration connected only to one end portion in the lateral direction of the band-like sound absorbing member 6, and therefore, damaging of the band-like sound absorbing member 6 caused by stress occurring on the band-like sound absorbing member 6 can be reduced.

As illustrated in FIG. 3, the width of the cuts 7 is set as width a and the width of the band-like sound absorbing member 6 is set as width A. At this time, the width a of the cuts 7 of the band-like sound absorbing member 6 is preferably 5% to 25% with regard to the width A of the band-like sound absorbing member 6.

In the aforementioned pneumatic tire, an interval with regard to the tire circumferential direction of the cuts 7 of the band-like sound absorbing member 6 may be randomly disposed, but the interval with regard to the tire circumferential direction of the cuts 7 of the band-like sound absorbing member 6 is preferably an equal interval based on the capability to uniformly respond to tensile strain in each direction. Thereby, the cuts 7 on an end portion of the band-like sound absorbing member 6 can open when cornering to promote heat dissipation from the band-like sound absorbing member 6. Herein, when the width a of the cuts 7 is too wide, the band-like sound absorbing member 6 will not be stable, and thus adhering properties when adhering the band-like sound absorbing member 6 onto the tire inner surface 4 will deteriorate. On the other hand, when the width a of the cuts 7 is too narrow, the band-like sound absorbing member 6 cannot follow deformation of the tire, and stress occurring on the band-like sound absorbing member 6 cannot be relieved, and therefore, an effect of improving the durability of the band-like sound absorbing member 6 is reduced. Furthermore, the heat dissipation area of the band-like sound absorbing member 6 is reduced, and therefore, heat dissipation from the band-like sound absorbing member 6 cannot be promoted, and thus an effect of improving high-speed durability of the tire is reduced.

Figure 4:
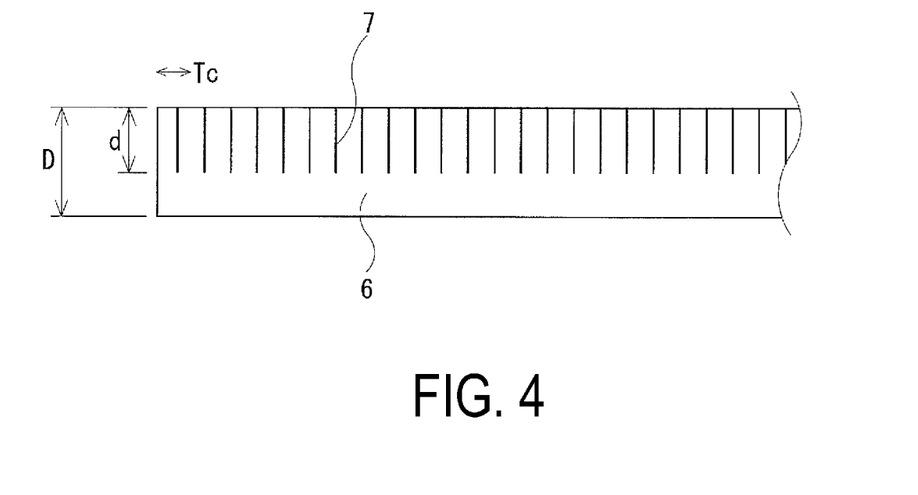
FIG. 4 is a cross-sectional view in a tire circumferential direction of the band-like sound absorbing member in FIG. 3.

FIG. 4 is a cross-sectional view in the tire circumferential direction of the band-like sound absorbing member 6. A depth of the cuts 7 is set as a depth d, and a thickness of the band-like sound absorbing member 6 is set as a thickness D. At this time, the depth d of the cuts 7 is preferably 50% or more with regard to the thickness D of the band-like sound absorbing member 6.

In the aforementioned pneumatic tire, the cuts 7 on an end portion of the band-like sound absorbing member 6 can open when cornering to promote heat dissipation from the band-like sound absorbing member 6. Furthermore, damaging of the band-like sound absorbing member 6 caused by tire strain can be effectively suppressed. Herein, when the depth d of the cuts 7 is too shallow, heat dissipation from the band-like sound absorbing member 6 will be slow, high-speed durability of the tire will deteriorate, and the band-like sound absorbing member 6 cannot follow tire deflection when cornering, which as a result may lead to damaging of the band-like sound absorbing member 6.

In the aforementioned pneumatic tire, a volume of the band-like sound absorbing member 6 is preferably 10% to 30% with regard to the luminal volume of a tire. Furthermore, the width A of the band-like sound absorbing member 6 is more preferably 30% to 90% with regard to a tire ground contact width. Thereby, a sound absorbing effect based on the band-like sound absorbing member 6 can be even further achieved. Herein, when the volume of the band-like sound absorbing member 6 is less than 10% with regard to the luminal volume of the tire, a sound absorbing effect cannot be appropriately achieved. Furthermore, when the volume of the band-like sound absorbing member 6 exceeds 30% with regard to the luminal volume of the tire, the reducing effect against noise due to the cavernous resonance phenomenon will be constant, and a further reducing effect cannot be expected.

Furthermore, as illustrated in FIG. 2, the band-like sound absorbing member 6 preferably has a missing portion 9 in at least one section in the tire circumferential direction. The missing portion 9 is a portion where the band-like sound absorbing member 6 is not present on a tire circumference. By providing the missing portion 9 on the band-like sound absorbing member 6, long-term resistance is possible against expansion due to tire inflation and shear strain of an adhering surface caused by a ground-containing rolling motion, and shear strain generated on the adhering surface of the band-like sound absorbing member 6 can be effectively relieved. The missing portion 9 is preferably provided at one or 3 to 5 sections on the tire circumference. In other words, when the missing portion 9 is provided on two sections on the tire circumference, tire uniformity significantly deteriorates due to mass unbalance, and when the missing portion 9 is provided on 6 sections or more, manufacturing cost significantly increases.

Note that if the missing portion 9 is provided on two or more sections on the tire circumference, the band-like sound absorbing member 6 is interrupted in the tire circumferential direction. However, even in this case, for example, if a plurality of the band-like sound absorbing members 6 are mutually connected by another laminate such as an adhesive layer 5 formed from a double-side adhesive tape, the band-like sound absorbing members 6 can be handled as an integral member, and therefore, the work of applying to the tire inner surface 4 can be easily performed.

Figure 5A:
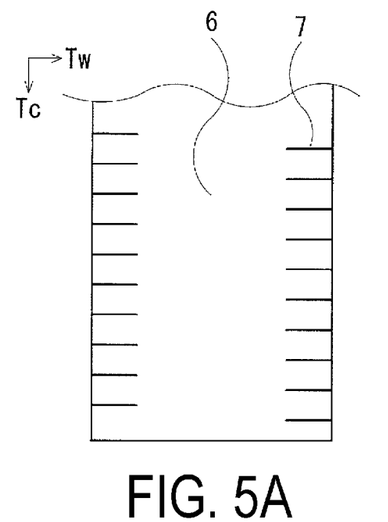
FIG. 5A to FIG. 5D illustrate modified examples of cuts of a band-like sound absorbing member adhered to an inner surface of a pneumatic tire of the present technology.
Figure 5B:
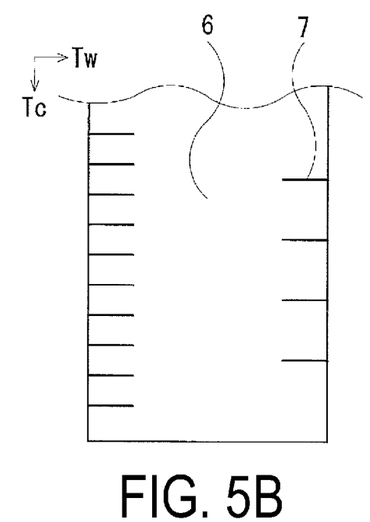
Figure 5C:
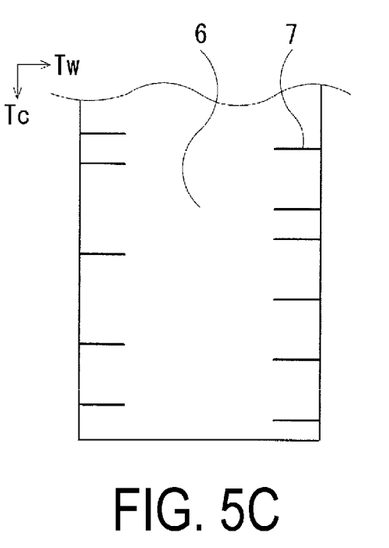
Figure 5D:
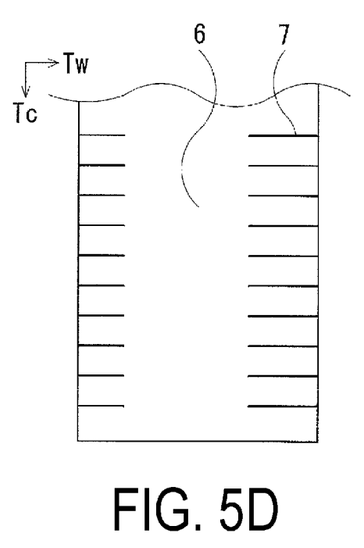

Examples of the cuts 7 can include, in addition to the case illustrated in FIG. 1, cases where the cuts 7 are disposed in a mutually different manner on both end portions of the band-like sound absorbing member 6 as illustrated in FIG. 5A, cases where the number of provided cuts 7 are different on both end portions of the band-like sound absorbing member 6 as illustrated in FIG. 5B, cases where the cuts 7 are randomly disposed as illustrated in FIG. 5C, and cases where the width of the cuts 7 is formed so as to be different on both end portions of the band-like sound absorbing member 6 as illustrated in FIG. 5D.

The present technology is further described below by examples, but the scope of the present technology is not limited to these examples.

EXAMPLES

Tires of a Conventional Example and Examples 1 to 8 where the width of the cuts (width a/width A×100%) and the depth of the cuts (depth d/thickness D×100%) were set as in Table 1-1 and Table 1-2 were prepared for a pneumatic tire provided with an annular-shaped tread portion extending in a tire circumferential direction, a pair of sidewall portions disposed on both sides of the tread portion, and a pair of bead portions disposed on an inner side in a tire radial direction of the sidewall portions, at a tire size of 275/35ZR20, where a band-like sound absorbing member was adhered on an inner surface of the tread portion in the tire circumferential direction.

The high-speed durability, durability, and adhering properties of the band-like sound absorbing member were evaluated for the test tires by the following testing method, and the results thereof are collectively shown in Table 1-1 and Table 1-2.

High-Speed Durability:

The test tires were assembled on wheels having a rim size of 20×9½J, and then subjected to a traveling test on a drum testing machine under testing conditions where the air pressure was 360 kPa and the load was 5 kN. Specifically, an initial speed was 250 km/h, the speed was increased by 10 km/h every 20 minutes, and the tire was run until failure occurred, and the reached step (speed) was measured. The results are shown in Table 1-1 and Table 1-2.

Durability:

"Durability" herein refers to strain followability which is a performance where the band-like sound absorbing member follows tire deflection during cornering. The test tires were assembled on wheels having a rim size of 20×9½J, and subjected to a traveling test on a drum testing machine under testing conditions where the air pressure was 170 kPa, and the load was 8.82 kN, and slip angle was ±5°, and then peeling of the adhering surface on the band-like sound absorbing member or presence/absence of damage on the band-like sound absorbing member was visually observed. The results are shown in Table 1-1 and Table 1-2. For the aforementioned items, cases where no dropout or damage occurred were denoted with "Excellent"; cases where peeling of the adhering surface or damaging of the band-like sound absorbing member occurred in a portion but was not problem were denoted with "Good"; cases where peeling of the adhering surface or damaging of the band-like sound absorbing member occurred on ¼ or less of the entire band-like sound absorbing member were denoted with "Fair"; and cases where peeling of the adhering surface or damaging of the band-like sound absorbing member occurred on ¼ or more of the entire band-like sound absorbing member were denoted with "Poor".

Adhering Properties of Band-Like Sound Absorbing Member:

In the aforementioned items, cases with no problems with adhering properties of the band-like sound absorbing member were denoted with "Excellent", and cases where the adhering properties of the band-like sound absorbing member gradually deteriorated but was sufficiently compatible were denoted with "Good".

TABLE 1-1

|  | Conventional example | Example 1 | Example 2 | Example 3 | Example 4 |
|---|---|---|---|---|---|
| Presence/absence of cuts | Absence | Presence | Presence | Presence | Presence |
| Width of cuts (width a/width A × 100%) | — | 2% | 5% | 15% | 25% |
| Depth of cut (Depth d/thickness D × 100%) | — | 47% | 47% | 47% | 47% |
| High-speed durability | 310 km/h | 320 km/h | 330 km/h | 330 km/h | 330 km/h |
| Durability: | Poor | Excellent | Excellent | Excellent | Excellent |
| Adhering properties of band-like sound absorbing member | — | Excellent | Excellent | Excellent | Excellent |

TABLE 1-2

|  | Example 5 | Example 6 | Example 7 | Example 8 |
|---|---|---|---|---|
| Presence/absence of cuts | Presence | Presence | Presence | Presence |
| Width of cuts (width a/width A × 100%) | 28% | 15% | 15% | 15% |
| Depth of cut (Depth d/thickness D × 100%) | 47% | 50% | 75% | 100% |
| High-speed durability | 330 km/h | 340 km/h | 340 km/h | 340 km/h |
| Durability: | Good | Excellent | Excellent | Excellent |
| Adhering properties of band-like sound absorbing member | Good | Excellent | Excellent | Good |

As seen in Table 1-1 and Table 1-2, the high-speed durability, durability, and adhering properties of the band-like sound absorbing member of the pneumatic tires of Examples 1 to 8 simultaneously improved.

The invention claimed is:

1. A pneumatic tire, comprising:
an annular-shaped tread portion extending in a tire circumferential direction;
a pair of sidewall portions disposed on both sides of the tread portion; and
a pair of bead portions disposed on an inner side in a tire radial direction of the sidewall portions; wherein
a band-like sound absorbing member is adhered on an inner surface of the tread portion in the tire circumferential direction;
a plurality of cuts with an angle θ with regard to the tire circumferential direction within a range of 40°≤θ≤90° are formed on both end portions in a lateral direction of the band-like sound absorbing member, and the cuts are connected only to one end portion in the lateral direction of the band-like sound absorbing member;
the cuts are in a closed state and are configured to open during deformation of the pneumatic tire;
a depth d of the cuts is 50% or more and less than 100% with regard to a thickness D of the band-like sound absorbing member; and
the cuts are not formed in a surface of the sound absorbing member adhered to the inner surface of the tread portion.

2. The pneumatic tire according to claim 1, wherein the band-like sound absorbing member has a missing portion in at least one section in the tire circumferential direction.

3. The pneumatic tire according to claim 1, wherein a width a of the cuts of the band-like sound absorbing member is 5% to 25% with regard to a width A of the band-like sound absorbing member.

4. The pneumatic tire according to claim 3, wherein a depth d of the cuts is 50% or more with regard to a thickness D of the band-like sound absorbing member.

5. The pneumatic tire according to claim 4, wherein a volume of the band-like sound absorbing member is 10% to 30% with regard to luminal volume of the tire.

6. The pneumatic tire according to claim 5, wherein the band-like sound absorbing member has a missing portion in at least one section in the tire circumferential direction.

7. The pneumatic tire according to claim 3, wherein the band-like sound absorbing member has a missing portion in at least one section in the tire circumferential direction.

8. The pneumatic tire according to claim 3, wherein a volume of the band-like sound absorbing member is 10% to 30% with regard to luminal volume of the tire.

9. The pneumatic tire according to claim 8, wherein the band-like sound absorbing member has a missing portion in at least one section in the tire circumferential direction.

10. The pneumatic tire according to claim 1, wherein a volume of the band-like sound absorbing member is 10% to 30% with regard to luminal volume of the tire.

11. The pneumatic tire according to claim 10, wherein the band-like sound absorbing member has a missing portion in at least one section in the tire circumferential direction.

* * * * *